United States Patent
Grun et al.

(10) Patent No.: US 11,337,448 B2
(45) Date of Patent: May 24, 2022

(54) EMULSIFIED SAVOURY FOOD CONCENTRATE

(71) Applicant: Conopco Inc., Englewood Cliffs, NJ (US)

(72) Inventors: Christian Grun, Vlaardingen (NL); Florian Keim, Heilbronn (DE); Hyun-Jung Kim, Vlaardingen (NL); Marc Lemmers, Vlaardingen (NL); Winfried Sailer, Heilbronn (DE)

(73) Assignee: Conopco Inc., Englewood Cliffs, NJ (US)

( * ) Notice: Subject to any disclaimer, the term of this patent is extended or adjusted under 35 U.S.C. 154(b) by 0 days.

(21) Appl. No.: 16/343,005

(22) PCT Filed: Nov. 6, 2017

(86) PCT No.: PCT/EP2017/078316
§ 371 (c)(1),
(2) Date: Apr. 18, 2019

(87) PCT Pub. No.: WO2018/083296
PCT Pub. Date: May 11, 2018

(65) Prior Publication Data
US 2020/0054054 A1      Feb. 20, 2020

(30) Foreign Application Priority Data

Nov. 7, 2016 (EP) .................................. 16197581

(51) Int. Cl.
A23L 23/10 (2016.01)
A23L 27/00 (2016.01)
A23L 31/15 (2016.01)

(52) U.S. Cl.
CPC ............. *A23L 23/10* (2016.08); *A23L 27/80* (2016.08); *A23L 31/15* (2016.08); *A23V 2002/00* (2013.01)

(58) Field of Classification Search
CPC .......... A23L 23/10; A23L 31/15; A23L 27/80
USPC ......................................... 426/62, 601, 602
See application file for complete search history.

(56) References Cited

U.S. PATENT DOCUMENTS

| 5,415,883 A | 5/1995 | Leu |
| 6,254,918 B1 * | 7/2001 | Ammedick-Naumann ............. A23L 19/01 426/589 |
| 2003/0203096 A1 * | 10/2003 | Hamm ............... A23G 2200/08 426/589 |
| 2007/0274930 A1 | 11/2007 | Witteveen et al. |
| 2008/0311251 A1 * | 12/2008 | Achterkamp ......... A23L 29/238 426/62 |

FOREIGN PATENT DOCUMENTS

| CN | 1217159 | 11/1997 |
| CN | 102665442 | 12/2010 |
| CN | 101999617 | 4/2011 |
| CN | 104381971 | 3/2015 |
| EP | 0669084 | 8/1995 |
| JP | H0339065 A | 2/1991 |
| KR | 20040071846 | 8/2004 |
| WO | 97/02356 A1 | 1/1997 |
| WO | 2008/151853 A1 | 12/2008 |
| WO | 2012/097934 A1 | 7/2012 |

OTHER PUBLICATIONS

CN111480734—English Abstract (Year: 2020).*
Chaud, S. G. et al. Cienc. Tecnol. Aliment., Campinas 26: 369-379—English Abstract (Year: 2006).*
Moreira, L. R. S. et al. Appl. Microbiol. Biotechnol. 79: 165-178 (Year: 2008).*
Chaud and Sgarbieri: "Functional Properties of yeast cellular wall of alcoholic fermentation and its glycan, mannan, and glycoprotein fractions", Ciênc. Tecnol Aliment., vol. 26, No. 2, Apr. 1, 2006-Jun. 1, 2006, pp. 369-379, XP002769795, Campinas.
Database FSTA [Online] International Food Information Service (IFIS), Frankfurt-Main, DE; Jan. 1, 1991, Gamal NF et al: "Kinetic behaviour of proteolytic enzymes on yeast protein.", XP002769794, Database accession No. FS-1991-09-B-0152 & Gamal, N.F. and Gamal R. F. Kinetic behaviour of proteolytic enzymes on yeast protein. Egyptian J. Microbiol. 23 : 59-69 (1988).
Lafarge Céline et al_: "Effect of konjac glucomannan addition on aroma release in gels containing potato starch", Food Research International, Elsevier, Amsterdam, NL vol. 64, Jul. 27, 2014, pp. 412-419, XP029049579, SSN: 0963-9969, DOI: 10.1016/J.FOODRES. 2014.07.008.

* cited by examiner

*Primary Examiner* — Hamid R Badr
(74) *Attorney, Agent, or Firm* — N.V. Nederlandsch Octrooibureau

(57) ABSTRACT

The present invention relates to an emulsified savoury food concentrate comprising by weight of the food concentrate:
a. 15-50 wt. % water;
b. 15-60 wt. % edible oil;
c. 13-40 wt. % by dry weight of non-gelatinised starch;
d. 50-350 mmol per 100 g of food concentrate of alkali-metal cation selected from $Na^+$, $K^+$ and combinations thereof;
e. Yeast mannan in an amount of at least 0.6% by weight of the edible oil; and
f. 0-10 wt. % of vegetable powders and/or vegetable extracts;
wherein the w/w ratio of oil to water is at least 0.8:1 and wherein the w/w ratio of non-gelatinised starch by dry weight to water lies in the range of 0.35:1-2.1:1.
The present invention further relates to a process of preparing the emulsified savoury food concentrate and to a method of preparing an edible savoury product using the emulsified savoury food concentrate.

13 Claims, No Drawings

EMULSIFIED SAVOURY FOOD CONCENTRATE

FIELD OF THE INVENTION

The present invention relates to a savoury food concentrate that can suitably be used in the preparation of soups, sauces and gravies to provide taste and thickness in the final product. The savoury food concentrate can also be applied as a seasoning or a condiment on meal components.

BACKGROUND OF THE INVENTION

Industrially produced savoury products such as bouillons, soups and sauces, can be divided in ready-to-eat products and concentrated products. Ready-to-eat products merely require heating by the consumer and are quick and convenient. Concentrated products need to be diluted with hot aqueous liquid before consumption. Consequently, the levels of food ingredients in food concentrates are relatively high so that after dilution the desired concentrations of these food ingredients are obtained in the end product.

The high concentration levels of food ingredients in savoury food concentrates can lead to a variety of problems, especially if upon dilution these concentrates have to yield a product having a rich savoury flavour and a creamy appearance, i.e. having a light colour.

In order to obtain a ready-to-eat product with a nice thick, creamy consistency after at least 1 time dilution, thickening agents need to be incorporated in the food concentrate in such high concentrations that the food concentrate tends to become highly viscous and essentially unprocessable. Inclusion of high levels of oil in concentrated products can give rise to other problems, most notably in the form of oil separation (exudation) during storage. Water is often required as continuous phase for easy dispersion of the concentrate while it also acts as dissolving constituent for numerous flavourings. Finally, it is important that the concentrates do not separate into different layers during storage.

Ungelatinized starch is a thickener that is commonly applied in savoury concentrates. Gelatinization of the ungelatinized starch should not occur until the savoury concentrate is combined with an aqueous liquid and heated to a temperature above the gelatinization temperature of the starch during meal preparation. One of the drawbacks with the application of high levels of ungelatinized starch in savoury food concentrates is, that it may introduce undesirable visible starch sedimentation in the product during storage.

In savoury concentrates comprising high amounts of oil, water and ungelatinized starch, emulsifiers can be added to stabilize the oil-in-water emulsion to prevent oil separation.

A highly concentrated, stable, emulsion can also help to prevent visible starch sedimentation. Not all emulsifiers are suited for these types of savoury concentrates. For example, food proteins or chemically modified starch may increase the viscosity of the mixture of food concentrate ingredients to such an extent during processing, that the food concentrates are not processable in a production line. Also, the presence of high salt levels in the food concentrates may decrease the stability of the emulsion.

Moreover, the present consumer is in favour of natural foods and food products, and is in particular looking for food products which are prepared using traditional recipes, without the use of ingredients which can be considered to be chemical or not natural, and which food products nevertheless have the freshness, the stability after production, and other positive properties of modern food products. The consumer thus prefers emulsified savoury food concentrates that do not comprise non-natural emulsifiers.

U.S. Pat. No. 6,254,918 describes a solution to this problem. U.S. Pat. No. 6,254,918 describes a semifluid, binding foodstuff composition for seasoning, colouring or seasoning and colouring consisting essentially of
   5% to 20% of a food grade oil;
   5% to 30% water;
   1% to 23% ungelatinized starch; and
   15% to 35% of a vegetable and/or fruit powder in finely divided form containing cell wall and/or fiber; and
   no emulsifiers,
said composition having an oil-in-water emulsion and having starch granules and oil droplets with free water in the interstitial spaces and no sediment of said ungelatinized starch.

The presence of 15% to 35% of a vegetable and/or fruit powder in the semifluid, binding foodstuff composition of U.S. Pat. No. 6,254,918 prevents the sedimentation of the ungelatinized starch. One of the drawbacks of this solution is that this amount of vegetable and/or fruit powders increases the tendency to develop off-flavours and discoloration during storage. Without wishing to be bound by theory, this may be due to the large amounts of specific reducing sugars present in the vegetable and/or fruit powders. Another drawback of using high levels of vegetable and/or fruit powders is that these powders have a specific taste, such as sweetness, which is not applicable in each type of taste profile.

Thus there is a need to provide an improved emulsified savoury food concentrate with non-gelatinised starch, which is stable in storage and does not show starch sedimentation, which does not need at least 15% of vegetable and/or fruit powders and which is processable during the production of the savoury food concentrate.

SUMMARY OF THE INVENTION

The present invention provides an emulsified savoury food concentrate that overcomes the aforementioned drawbacks, while also providing a savoury food concentrate that is considered a natural food product by the consumer.

The present invention relates to an emulsified savoury food concentrate comprising by weight of the food concentrate:
   a. 15-50 wt. % water;
   b. 15-60 wt. % edible oil;
   c. 13-40 wt. % by dry weight of non-gelatinised starch;
   d. 50-350 mmol per 100 g of food concentrate of alkali-metal cation selected from $Na^+$, $K^+$ and combinations thereof;
   e. Yeast mannan in an amount of at least 0.6% by weight of the edible oil; and
   f. 0-10 wt. % of vegetable powders and/or vegetable extracts;
wherein the w/w ratio of oil to water is at least 0.8:1 and wherein the w/w ratio of non-gelatinised starch by dry weight to water lies in the range of 0.35:1-2.1:1.

The present invention provides an emulsified savoury food concentrate that offers the advantage that it can be readily dispersed in hot aqueous liquids. After dispersion, the oil and the starch contained in the concentrate assist in producing a ready-to-eat savoury product with a creamy appearance and perceivable increase in viscosity of the liquid, especially once the starch component has been substantially gelatinised. The savoury food concentrate is easy to manufacture.

The savoury food concentrate may suitably be packaged in, for instance, a pouch or a sachet. The packaged concentrate is physically stable, in that it does not exhibit oil exudation during storage at ambient temperature, nor does it show visible starch sedimentation. Also, the packaged concentrate can be safely stored, without any microbial hazard, at ambient temperature for up to several months.

The invention further pertains to a process of preparing an emulsified savoury food concentrate as described herein before, said process comprising:
- dispersing yeast extract in water to obtain a yeast extract dispersion;
- combining the yeast extract dispersion with oil and emulsifying the combination to obtain an emulsion;
- combining the emulsion with non-gelatinised starch and alkali-metal salt to obtain a food concentrate.

The invention also pertains to a method of preparing an edible savoury product, said method comprising combining 1 part by weight of an emulsified savoury food concentrate, as described herein before, with at least 1 part by weight of an aqueous liquid.

DETAILED DESCRIPTION OF THE INVENTION

A first aspect of the invention relates to an emulsified savoury food concentrate comprising by weight of the food concentrate:
a. 15-50 wt. % water;
b. 15-60 wt. % edible oil;
c. 13-40 wt. % by dry weight of non-gelatinised starch;
d. 50-350 mmol per 100 g of food concentrate of alkali-metal cation selected from $Na^+$, $K^+$ and combinations thereof;
e. Yeast mannan in an amount of at least 0.6% by weight of the edible oil; and
f. 0-10 wt. % of vegetable powders and/or vegetable extracts;
wherein the w/w ratio of oil to water is at least 0.8:1 and wherein the w/w ratio of non-gelatinised starch by dry weight to water lies in the range of 0.35:1-2.1:1.

The term "oil" as used herein refers to glycerides selected from triglycerides, diglycerides, monoglycerides, phosphoglycerides and combinations thereof. The oil can be liquid, solid or semi-solid at ambient temperature (20° C.).

The term "gelatinized starch" as used herein refers to starch that has undergone gelatinization. Starch gelatinization is a process that breaks down the intermolecular bonds of starch molecules in the presence of water and heat, allowing the hydrogen bonding sites to engage more water. This irreversibly dissolves the starch granule. Penetration of water increases randomness in the general starch granule structure and decreases the number and size of crystalline regions. Under the microscope in polarized light starch loses its birefringence and its extinction cross during gelatinization. Some types of unmodified native starches start swelling at 55° C., other types at 85° C. The gelatinization temperature depends on the degree of cross-linking of the amylopectin and on the presence of other components, such as salt or sugars.

The term "chemically modified starch" as used herein refers to starch that has been chemically, including enzymatically, altered. Chemical modification of starch generally involves esterification, etherification or oxidation of the available hydroxyl groups on the alpha-D-glucopyranosyl units that make up the starch polymers.

The "alkali-metal cation" as used herein, may be part of a non-dissociated salt (e.g. NaCl or KCl) in the savoury concentrate, or it may be contained in the savoury concentrate in dissolved, dissociated form. At least a part of the alkali-metal cation contained in the savoury concentrate is present in dissolved, dissociated form.

The term "yeast mannoprotein" as used herein refers to mannosylated protein that is typically present in the cell wall of yeasts (e.g. *Saccharomyces* sp.). Yeast mannoprotein comprises a proteinaceous part and a carbohydrate part. The carbohydrate part mainly comprises mannose residues and amounts up to 90 wt. % or more by weight of the yeast mannoprotein.

The term "yeast mannan" as used herein refers to the carbohydrate part, i.e. the mannose residue-containing part of the yeast mannoproteins. Yeast mannan comprises on average 200 mannose residues. The mannose residues are typically comprised of a highly branched backbone of α-(1-6)-linked mannose residues, which may be substituted at the C2 position with side chains consisting of α-(1-2)-linked and some α-(1-3)-linked mannose residues. Although these are the predominant residues and linkages, other monosaccharide residues, such as N-acetylglucosamine, and other types of linkages may also occur.

Amounts of yeast mannan, as used herein, are defined by the weight of the total mannose content. Total mannose content may be quantified using methods known in the field, such as acidic hydrolysis of the sample comprising yeast mannan, followed by detection and quantification of the released mannose residues. This includes, but is not limited to, the method described in De Ruiter et al., Analytical Biochemistry, vol. 207, issue 1, p. 176-185 (1992). Depending on the complexity of the matrix, an isolation and/or purification step may be preceding the quantification step.

Yeast mannan can be distinguished from plant mannans mainly in the type of linkage. While the backbone of yeast mannan is comprised of α-(1-6)-linked mannose residues, plant mannans are generally comprised of a backbone consisting of β-(1-4)-linked mannose residues. Yeast and plant mannans can be differentiated by using analytical methods known in the field of carbohydrate chemistry, such as, among others, NMR spectroscopy, acetolysis, or enzymatic hydrolysis.

The term "emulsion" as used herein refers to a mixture that comprises an oil phase and an aqueous phase. The emulsion may additionally contain solid particles such as, for instance, herbs and spices.

Concentrations that are expressed herein by weight of oil or by weight of water, unless indicated otherwise, refer to the concentration (wt. %) calculated by weight of the total amount of oil, respectively the total amount of water ($H_2O$), that is present in the savoury food concentrate.

The savoury food concentrate according to the present invention is an edible product. Consequently, also the ingredients of the savoury food concentrate are all edible ingredients.

The savoury food concentrate according to the present invention is preferably water-continuous. A water-continuous concentrate offers the advantage that it is easier to disperse in water.

The savoury food concentrate of the present invention preferably comprises 16-45 wt. % of water. More preferably the food concentrate comprises 17-40 wt. % of water and most preferably the food concentrate comprises 18-35 wt. % of water.

The savoury food concentrate of the present invention preferably has a water activity which lies in the range of 0.5-0.9. More preferably the food concentrate has a water activity in the range of 0.55-0.85, most preferably in the range of 0.60-0.80.

The savoury food concentrate of the present invention preferably comprises 18-55 wt. % of oil. More preferably the food concentrate comprises 20-50 wt. % of oil, most preferably the food concentrate comprises 25-45 wt. % of oil.

The oil in the savoury food concentrate of the present invention preferably contains at least 50 wt. % vegetable oil, more preferably at least 80 wt. % of vegetable oil. Most preferably, the oil in the savoury food concentrate is a vegetable oil.

The vegetable oil is preferably selected from sunflower oil, rapeseed oil, palm oil, corn (maize) oil, olive oil, soybean oil, cottonseed oil, palm kernel oil, coconut oil, fractions of these oils and combinations thereof. More preferably, the vegetable oil is selected from sunflower oil, rapeseed oil, palm oil, corn (maize) oil, olive oil, soybean oil, fractions of these oils and combinations thereof. Most preferably, the vegetable oil is selected from sunflower oil, rapeseed oil, palm oil, corn (maize) oil, fractions of these oils and combinations thereof.

The oil contained in the savoury food concentrate may be liquid, semi solid or solid, but preferably is liquid. Preferably, the oil contained in food concentrate has a solid fat content at 20° C. ($N_{20}$) of not more than 10%. Even more preferably, the oil has a $N_{20}$ of not more than 5% and most preferably the oil has a $N_{20}$ of not more than 1%. The solid fat content of the oil can suitably be determined using the method described in *Animal and vegetable fats and oils—Determination of solid fat content by pulsed NMR—Part 1: Direct method*—ISO 8292-1:2008.

The weight (w/w) ratio of oil to water in the savoury food concentrate of the present invention preferably lies in the range of 0.9:1 to 3:1. More preferably the weight (w/w) ratio of oil to water lies in the range of 1:1 to 2.7:1, most preferably the weight (w/w) ratio of oil to water lies in the range of 1.25:1 to 2.5:1.

The combination of oil and water preferably represents at least 40 wt. % of the savoury food concentrate of the present invention. More preferably the combination of oil and water represents at least 45 wt. %, most preferably 50-75 wt. % of the savoury food concentrate.

The savoury food concentrate of the present invention preferably comprises 14-38 wt. % by dry weight of non-gelatinised starch. More preferably the savoury food concentrate comprises 16-34 wt. % by dry weight of non-gelatinised starch, most preferably the savoury food concentrate comprises 18-30 wt. % by dry weight of non-gelatinised starch.

The non-gelatinised starch of the present invention is preferably selected from native starch, physically modified starch, and combinations thereof. More preferably the non-gelatinised starch is a physically modified starch.

Examples of native starch are native potato starch or native corn starch. An example of physically modified starches is heat-moisture treated (HMT) starch.

The savoury food concentrate of the present invention preferably contains less than 3 wt. %, more preferably less than 2 wt. % and even more preferably less than 1 wt. % by dry weight of chemically modified starch. Most preferably, the food concentrate contains no chemically modified starch.

The weight (w/w) ratio of non-gelatinised starch by dry weight to water in the savoury food concentrate of the present invention preferably lies in the range of 0.4:1-1.9:1. More preferably the weight (w/w) ratio of non-gelatinised starch by dry weight to water lies in the range of 0.5:1-1.7:1, most preferably the weight (w/w) ratio of non-gelatinised starch by dry weight to water lies in the range of 0.55:1-1.2:1.

The savoury food concentrate of the present invention preferably comprises 70-320 mmol per 100 g of food concentrate of alkali-metal cation. More preferably the food concentrate comprises 90-290 mmol per 100 g of food concentrate of alkali-metal cation and most preferably comprises 110-260 mmol per 100 g of food concentrate of alkali-metal cation.

The savoury food concentrate of the present invention preferably comprises yeast mannan in an amount of 0.7-6% by weight of the edible oil. More preferably the savoury food concentrate comprises yeast mannan in an amount of 0.85-3% by weight of the edible oil and most preferably the savoury food concentrate comprises yeast mannan in an amount of 1-1.5% by weight of the edible oil.

The savoury food concentrate of the present invention preferably comprises 0-7.5 wt. %, more preferably 0-5 wt. % and most preferably 0-2.5 wt. % of vegetable powders and/or vegetable extracts.

The savoury food concentrate of the present invention preferably comprises 0-10 wt. %, more preferably 0-7.5 wt. %, even more preferably 0-5 wt. % and most preferably 0-2.5 wt. % of fruit powders and/or fruit extracts.

The savoury food concentrate of the present invention preferably contains at least 0.5 wt. % of dry matter from savoury ingredients selected from herbs, spices, sugars, meat extract, glutamate, citric acid, acetic acid and combinations thereof. More preferably the savoury food concentrate contains 1-25 wt. %, most preferably 2-15 wt. % of dry matter from savoury ingredients selected from herbs, spices, sugars, meat extract, glutamate, citric acid, acetic acid and combinations thereof.

Preferably, the enzyme activity in the herbs and/or spices is deactivated, e.g. by treating the herbs and/or spices with steam.

Preferably, the combination of the water, the oil, the non-gelatinised starch and the alkali metal cation constitutes at least 70 wt. %, more preferably at least 80 wt. % of the savoury food concentrate of the present invention.

Preferably, the combination of non-gelatinised starch and the alkali metal cation constitutes at least 15 wt. %, more preferably at least 20 wt. % of the savoury food concentrate of the present invention.

The savoury food concentrate of the present invention can be produced as a stable emulsion without the need of further emulsifiers. Accordingly, in a preferred embodiment, the savoury food concentrate does not contain an added emulsifier in the form of a fatty acid ester selected from the group of monoglycerides, diglycerides, phosphoglycerides, mono- and diacetyl tartaric acid esters of mono- and diglycerides of fatty acids, acetic acid esters of mono and diglycerides of fatty acids, lactic acid esters of mono and diglycerides of fatty acids, citric acid esters of fatty acids, stearoyl-2-lactylate, polyglycerol esters of fatty acids, propane-1,2-diol esters of fatty acids, sucrose fatty acid esters, sorbitan fatty acid ester, polyglycerol polyricinoleate and combinations thereof.

Preferably the food concentrate according to the invention is pourable, i.e. it is so liquid that it can be poured out of a container.

Preferably, the food concentrate according to the invention comprises by weight of the food concentrate:

a. 18-35 wt. % water;
b. 25-45 wt. % edible oil;
c. 18-30 wt. % by dry weight of non-gelatinised starch;
d. 110-260 mmol per 100 g of food concentrate of alkali-metal cation selected from Na+, K+ and combinations thereof;
e. Yeast mannan in an amount of 1-1.5% by weight of the edible oil;
f. 0-5 wt. % of vegetable powders and/or vegetable extracts; and
g. 2-15 wt. % of dry matter from savoury ingredients selected from herbs, spices, sugars, meat extract, glutamate, citric acid, acetic acid and combinations thereof;
wherein the w/w ratio of oil to water lies in the range of 1.25:1-2.5:1 and wherein the w/w ratio of non-gelatinised starch by dry weight to water lies in the range of 0.55:1-1.2:1.

A second aspect of the present invention relates to a process of preparing an emulsified savoury food concentrate, as described herein before, said process comprising:
 dispersing yeast extract in water to obtain a yeast extract dispersion;
 combining the yeast extract dispersion with oil and emulsifying the combination to obtain an emulsion;
 combining the emulsion with non-gelatinised starch and alkali-metal salt to obtain the food concentrate.

In the process of the present invention the yeast extract preferably contains at least 0.5% of yeast mannan by weight of dry matter of the yeast extract. More preferably the yeast extract contains 1-10 wt. %, most preferably 1.5-8 wt. % of yeast mannan by weight of dry matter of the yeast extract.

In the process of the present invention the alkali-metal salt is preferably selected from NaCl, KCl and combinations thereof.

A third aspect of the present invention relates to a method of preparing an edible savoury product, said method comprising combining 1 part by weight of an emulsified savoury food concentrate, as described herein before, with at least 1 part by weight of an aqueous liquid.

Preferably, 1 part by weight of the emulsified savoury food concentrate is combined with at least 2 parts by weight of the aqueous liquid. More preferably, 1 part by weight of the emulsified savoury food concentrate is combined with at least 3 parts by weight of the aqueous liquid. Most preferably, 1 part by weight of the emulsified savoury food concentrate is combined with 4-50 parts by weight of the aqueous liquid.

Preferably, the aqueous liquid employed in the present method has a temperature of at least 50° C.

The invention is further illustrated by the following non-limiting examples.

EXAMPLES

Example 1

The amount of yeast mannan was determined in four different yeast extract samples. The yeast extract samples were hydrolysed, thereby hydrolysing the yeast mannan in each sample into mannose monosaccharides. The hydrolysis comprised the steps of methanolysis, followed by TFA (trifluoroacetic acid) hydrolysis, according to the method described in De Ruiter et al., Analytical Biochemistry, vol. 207, issue 1, p. 176-185 (1992). The amount of mannose in each sample was determined. The amount of mannose was taken as a measure for the amount of yeast mannan in each yeast extract sample.

Table 1 shows the characteristics of the assessed yeast extract samples.

TABLE 1

|  | YE-I (wt. %) | YE-II (wt. %) | YE-III (wt. %) | YE-IV (wt. %) |
|---|---|---|---|---|
| Yeast mannan[1] | 6.2 | 5.0 | 1.8 | 2.8 |
| NaCl[1] | 18 | 0.8 | 19 | 12 |
| Water[2] | 4 | 6 | 6 | 37 |
| Format | powder | powder | powder | liquid |

[1]By weight of dry matter
[2]By weight of extract

Example 2

Different savoury food concentrates were prepared using the ingredients as indicated in Table 2 and according to the following method.

First water and yeast extract were mixed at speed 3 in a Thermomix® TM31 blender for 3 minutes to obtain an aqueous mixture comprising yeast extract.

Subsequently the remaining dry ingredients, except for the ungelatinized starch and salt, were added to the aqueous mixture comprising yeast extract and the mixture was mixed at speed 3 for 1 minute. Temperature is kept at room temperature.

Next, oil was added slowly to this mixture, while homogenizing the mixture at speed 7 for 6-8 minutes to obtain an emulsion. The emulsion was further homogenized at speed 10 for 1 minute. The temperature during homogenizing was kept below 38° C. by cooling the mixing vessel.

Subsequently starch, salt and herbs were added to the emulsion and mixed at speed 3 for 1 minute at a temperature below the swelling temperature of the ungelatinized starch, to obtain a savoury food concentrate.

The obtained savoury food concentrate was filled into a transparent container.

The filled containers were stored at 20° C. for 7 days. After this period, the stored savoury concentrates were visually inspected to assess their stability during storage.

TABLE 2

| Ingredients (%) | 1 | 2 | 3 | 4 | 5 | 6 | 7 | 8 |
|---|---|---|---|---|---|---|---|---|
| Water | 30 | 20.3 | 19 | 22 | 20 | 20 | 20 | 20 |
| Sunflower oil | 30 | 30 | 29 | 33 | 34 | 45 | 45 | 45 |
| Corn starch[1] | 15 | — | 40 | 23 | — | 20 | 20 | 15 |
| Heat moisture treated potato starch[2] | — | 15 | — | — | 25 | — | — | — |
| NaCl | 10.0 | 10.0 | 6.4 | 8.5 | 4.7 | 6.7 | 6.7 | 6.7 |
| YE-I | 14.5 | — | 3.5 | — | — | 5.5 | 7.8 | 7.8 |
| YE-II | — | — | — | 4.2 | — | — | — | — |
| YE-III | — | — | — | — | 14.9 | — | — | — |
| YE-IV | — | 24.2 | — | — | — | — | — | — |
| Sugar | — | — | 1.7 | 8.8 | 0.9 | 2.3 | 0 | 5.0 |
| Herbs and spices[3] | 0.5 | 0.5 | 0.5 | 0.5 | 0.5 | 0.5 | 0.5 | 0.5 |
| Total | 100 | 100 | 100 | 100 | 100 | 100 | 100 | 100 |
| Oil to water | 0.9 | 1.0 | 1.2 | 1.3 | 1.5 | 2.0 | 2.0 | 2.0 |

TABLE 2-continued

| Ingredients (%) | 1 | 2 | 3 | 4 | 5 | 6 | 7 | 8 |
|---|---|---|---|---|---|---|---|---|
| ratio | | | | | | | | |
| Total water (wt. %)[4] | 32.6 | 30.4 | 24.4 | 25.3 | 22.7 | 22.9 | 23.0 | 22.3 |
| Total NaCl (wt. %)[5] | 12.6 | 12.9 | 7.0 | 8.5 | 7.5 | 7.7 | 8.1 | 8.1 |
| mmol alkali-cations per 100 g | 216 | 221 | 120 | 146 | 129 | 132 | 139 | 139 |
| Starch by dry weight to water ratio | 0.4 | 0.5 | 1.4 | 0.8 | 1.0 | 0.8 | 0.8 | 0.6 |
| Wt. % yeast mannan by weight of oil | 2.9 | 1.4 | 0.7 | 0.6 | 0.7 | 0.7 | 1.0 | 1.0 |

[1] Comprises 13 wt. % moisture and has a swelling temperature of about 60° C. in a 25% salt solution during processing
[2] Comprises 7 wt. % moisture and has a swelling temperature of about 45° C. in a 25% salt solution during processing
[3] Comprising basil, pepper and lovage
[4] Total water includes the water present in ingredients
[5] Total NaCl includes the NaCl present in ingredients, e.g. in yeast extracts Observations The stability of the savoury food concentrates 1-8 was assessed after 1 week in storage. All savoury food concentrates were stable and remained homogenous, i.e. no formation of layers occurred. The savoury food concentrates had a glossy appearance, but did not show oil exudation.

Example 3

Two different savoury food concentrates were prepared according to the method as described in example 1 and on the basis of the recipes shown in Table 3.

TABLE 3

| Ingredients (%) | A | B |
|---|---|---|
| Water | 20 | 14.8 |
| Sunflower oil | 45 | 45 |
| Heat moisture treated potato starch[1] | 25 | 20 |
| NaCl | 6.7 | 6.7 |
| YE-I | 2.8 | — |
| YE-IV | — | 13 |
| Herbs and spices[2] | 0.5 | 0.5 |
| Total | 100 | 100 |
| Oil to water ratio | 1.9 | 2.1 |
| Total water (wt. %)[3] | 23.4 | 21.1 |
| Total NaCl (wt. %)[4] | 7.2 | 8.3 |
| mmol alkali-cations per 100 g | 123 | 142 |
| Starch by dry weight to water ratio | 0.9 | 0.9 |
| Wt. % yeast mannan by weight of oil | 0.37 | 0.51 |

[1] Comprises 7 wt. % moisture and has a swelling temperature of about 45° C. in a 25% salt solution during processing
[2] Comprising basil, pepper and lovage
[3] Total water includes the water present in ingredients
[4] Total NaCl includes the NaCl present in ingredients, e.g. in yeast extracts Observations Savoury food concentrates A and B are both low in yeast mannan by weight of oil. The stability of the savoury food concentrates A and B was assessed after 1 week in storage. Savoury food concentrate A was layered; an oil layer was observed on the top and a water layer at the bottom. Savoury food concentrate B was also layered, an oil layer was observed on the top of this food concentrate.

Example 4

Two different savoury food concentrates were prepared on the basis of the recipes shown in Table 4. Food concentrate C was a similar composition as example 2 of U.S. Pat. No. 6,254,918, except that the amount of vegetable and fruit powder was decreased to less than 15 wt. %.

The savoury food concentrates were prepared using the following method:

All dry ingredients, except for the ungelatinized starch and salt, were dispersed in water in a Thermomix® TM31 blender. The dispersion was heated to 85° C. and mixed at speed 3 for 5 minutes, to obtain a heated mixture. Subsequently, the mixture was cooled down to 30° C.

Next, oil was added slowly to this mixture, while homogenizing the mixture at speed 7 for 6 minutes to obtain an emulsion. The emulsion was further homogenized at speed 10 for 1 minute. The temperature during homogenizing was kept below 38° C. by cooling the mixing vessel.

Subsequently starch, salt and herbs were added to the emulsion and mixed at speed 3 for 1 minute at a temperature below the swelling temperature of the ungelatinized starch, to obtain a savoury food concentrate.

The obtained savoury food concentrate was filled into a transparent container.

The filled containers were stored at 20° C. for 7 days. After this period, the stored savoury concentrates were visually inspected to assess their stability during storage.

TABLE 4

| Ingredients (%) | 9 | C |
|---|---|---|
| Water | 20 | 33.3 |
| Sunflower oil | 30 | 11 |
| Heat moisture treated potato starch[1] | 25 | 30 |
| NaCl | 5 | 7.4 |
| YE-I | 4 | 7.7 |
| Sugar | — | 1.5 |
| Seasoning[2] | 9.8 | 4 |
| Vegetable/Fruit[2] | 3.2 | 5 |
| Herbs and spices[2] | 3 | 0.1 |
| Total | 100 | 100 |
| Oil to water ratio | 1.3 | 0.3 |
| Total water (wt. %)[3] | 23.3 | 35.9 |
| Total NaCl (wt. %)[4] | 9.1 | 10.5 |
| mmol alkali-cations per 100 g | 156 | 180 |
| Starch by dry weight to water ratio | 1.0 | 0.8 |
| Wt. % yeast mannan by weight of oil | 0.8 | 4.2 |

| | Example 9 | Example C |
|---|---|---|
| Seasoning | Beef flavoring, meat base, chicken base, mushroom flavoring, broth base | Glutamate, meat extract |
| Vegetable/Fruit | White onion powder, white wine extract, lemon juice powder | Roast vegetable extract |
| Herbs and spices | Nutmeg, black pepper, fenugreek extract, lovage | Ground white pepper |

[1] Comprises 7 wt. % moisture and has a swelling temperature of about 45° C. in a 25% salt solution during processing
[2] 
[3] Total water includes the water present in ingredients
[4] Total NaCl includes the NaCl present in ingredients, e.g. in yeast extracts Observations The oil to water ratio in savoury food concentrate C is very low. The stability of the savoury food concentrates 9 and C was assessed after 1 week in storage. Savoury food concentrate 9 was stable and did not show separation into layers. Savoury food concentrate C unstable, because starch sedimentation was observed.

Example 5

Four different savoury food concentrates were prepared according to the method as described in example 4 and on the basis of the recipes shown in Table 5.

TABLE 5

| Ingredients (%) | D | E | F | G |
|---|---|---|---|---|
| Water | 35.5 | 10.3 | 15 | 10 |
| Sunflower oil | 20 | 45 | 18 | 28 |
| Heat moisture treated potato starch[1] | 20.9 | 13.3 | 57.3 | 26 |
| NaCl | 11.9 | 6.7 | 6 | 7 |
| YE-I | — | — | 3 | 20 |
| YE-IV | 11.2 | 24.2 | — | — |
| Sugar | — | — | 0.2 | 8.5 |
| Herbs and spices[2] | 0.5 | 0.5 | 0.5 | 0.5 |
| Total | 100 | 100 | 100 | 100 |
| Oil to water ratio | 0.5 | 2.2 | 0.9 | 2.2 |
| Total water (wt. %)[3] | 41.2 | 20.2 | 19.2 | 12.7 |
| Total NaCl (wt. %)[4] | 13.2 | 9.6 | 6.5 | 10.6 |
| mmol alkali-cations per 100 g | 227 | 164 | 112 | 181 |
| Starch by dry weight to water ratio | 0.5 | 0.6 | 2.8 | 1.9 |
| Wt. % yeast mannan by weight of oil | 1.0 | 0.9 | 1.0 | 4.3 |

[1]Comprises 7 wt. % moisture and has a swelling temperature of about 45° C. in a 25% salt solution during processing
[2]Comprising basil, pepper and lovage
[3]Total water includes the water present in ingredients
[4]Total NaCl includes the NaCl present in ingredients, e.g. in yeast extracts Observations The stability of the savoury food concentrates D-G was assessed after 1 week in storage:

The oil to water ratio in savoury food concentrate D is very low. Savoury food concentrate D was processable, but was unstable after 7 days of storage; three layers were observed from top to bottom in the filled container: oil, water and a starch layer.

The mixture of ingredients for savoury food concentrate E comprised too low levels of starch and no stable food concentrate could be obtained, because immediately after preparation different layers were observed in the food concentrate.

The mixture of ingredients for savoury food concentrate F comprised too much starch and the mixture was unable to absorb all the starch. This mixture was not processable.

The mixture of ingredients for savoury food concentrate G was too viscous, because the level of water was too low and therefore not all oil was taken up in the mixture. This mixture was not processable.

The invention claimed is:

1. An emulsified savoury food concentrate comprising by weight of the food concentrate:
   a. 15-50 wt. % water;
   b. 18-60 wt. % edible oil;
   c. 13-40 wt. % by dry weight of non-gelatinised starch;
   d. 50-350 mmol per 100 g of food concentrate of alkali-metal cation selected from the group consisting of Na$^+$, K$^+$ and combinations thereof;
   e. yeast mannan in an amount of at least 0.6% by weight of the edible oil; and
   f. 0-7.5 wt. % of vegetable powders and/or vegetable extracts;
   wherein the combination of oil and water represents at least 45 wt. % of the savoury food concentrate;
   wherein the combination of water, oil, the non-gelatinised starch and the alkali metal cation constitutes at least 80 wt. % of the food concentrate;
   wherein the w/w ratio of oil to water is at least 0.8:1 and wherein the w/w ratio of non-gelatinised starch by dry weight to water lies in the range of 0.35:1-2.1:1.

2. Food concentrate according claim 1, wherein the food concentrate comprises 16-45 wt. % of water.

3. Food concentrate according to claim 1, wherein the food concentrate comprises 20-55 wt. % of oil.

4. Food concentrate according to claim 1, wherein the food concentrate comprises 14-38 wt. % by dry weight of non-gelatinised starch.

5. Food concentrate according to claim 1, wherein the food concentrate comprises yeast mannan in an amount of 0.7-6% by weight of the edible oil.

6. Food concentrate according to claim 1, wherein the food concentrate comprises 0-10 wt. % of fruit powders and/or fruit extracts.

7. Food concentrate according to claim 1, wherein the food concentrate contains at least 0.5 wt. % of dry matter from savoury ingredients selected from herbs, spices, sugars, meat extract, glutamate, citric acid, acetic acid and combinations thereof.

8. Food concentrate according to claim 1, wherein the w/w ratio of oil to water lies in the range of 0.9:1 to 3:1.

9. Food concentrate according to claim 1, wherein the food concentrate comprises by weight of the food concentrate:
   a. 18-35 wt. % water;
   b. 25-45 wt. % edible oil;
   c. 18-30 wt. % by dry weight of non-gelatinised starch;
   d. 110-260 mmol per 100 g of food concentrate of alkali-metal cation selected from the group consisting of Na$^+$, K$^+$ and combinations thereof;
   e. Yeast mannan in an amount of 1-1.5% by weight of the edible oil;
   f. 0-5 wt. % of vegetable powders and/or vegetable extracts; and
   g. 2-15 wt. % of dry matter from savoury ingredients selected from herbs, spices, sugars, meat extract, glutamate, citric acid, acetic acid and combinations thereof;
   wherein the w/w ratio of oil to water lies in the range of 1.25:1-2.5:1 and wherein the w/w ratio of non-gelatinised starch by dry weight to water lies in the range of 0.55:1-1.2:1.

10. Food concentrate according to claim 1, wherein the food concentrate comprises 0-5 wt. % of vegetable powders and/or vegetable extracts.

11. A process of preparing an emulsified savoury food concentrate according to claim 1, said process comprising:
   dispersing yeast extract in water to obtain a yeast extract dispersion;
   combining the yeast extract dispersion with oil and emulsifying the combination to obtain an emulsion;
   combining the emulsion with non-gelatinised starch and alkali-metal salt to obtain the food concentrate,
   wherein the yeast extract contains at least 0.5% of yeast mannan by weight of dry matter of the yeast extract.

12. Process according to claim 11, wherein the alkali-metal salt is selected from the group consisting of NaCl, KCl and combinations thereof.

13. A method of preparing an edible savoury product, said method comprising combining 1 part by weight of an emulsified savoury food concentrate, according to claim 1, with at least 1 part by weight of an aqueous liquid.

* * * * *